US 8,241,766 B2

(12) United States Patent
Lu et al.

(10) Patent No.: US 8,241,766 B2
(45) Date of Patent: *Aug. 14, 2012

(54) LAMINATED EXCHANGE COUPLING ADHESION (LECA) MEDIA FOR HEAT ASSISTED MAGNETIC RECORDING

(75) Inventors: Bin Lu, Pittsburgh, PA (US); Ganping Ju, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 649 days.

This patent is subject to a terminal disclaimer.

(21) Appl. No.: 11/835,476

(22) Filed: Aug. 8, 2007

(65) Prior Publication Data

US 2011/0235205 A9   Sep. 29, 2011

Related U.S. Application Data

(63) Continuation-in-part of application No. 11/336,799, filed on Jan. 20, 2006, now Pat. No. 7,678,476.

(51) Int. Cl.
*G11B 5/66* (2006.01)
(52) U.S. Cl. ............ 428/828.1; 428/829; 428/830; 360/131
(58) Field of Classification Search .............. None
See application file for complete search history.

(56) References Cited

U.S. PATENT DOCUMENTS

| 5,208,797 A | 5/1993 | Nakaki et al. |
| 5,233,578 A | 8/1993 | Yamamoto et al. |
| 5,481,508 A | 1/1996 | Watanabe et al. |
| 5,503,924 A | 4/1996 | Osato |
| 5,508,982 A | 4/1996 | Challener, IV |
| 5,528,565 A | 6/1996 | Watanabe et al. |
| 5,599,619 A | 2/1997 | Eckhardt et al. |
| 5,612,131 A | 3/1997 | Bojarczuk, Jr. et al. |
| 5,639,567 A | 6/1997 | Challener, IV |
| 5,793,711 A | 8/1998 | Bojarczuk, Jr. et al. |
| 6,011,664 A | 1/2000 | Kryder et al. |

(Continued)

FOREIGN PATENT DOCUMENTS

DE    19546347 A1    7/1996

(Continued)

OTHER PUBLICATIONS

J.-U. Thiele et al., "Temperature dependent magnetic properties of highly chemically ordered $Fe_{55-x}Ni_xPt_{45}L1_0$ films", Journal of Applied Physics, vol. 91, No. 10, May 15, 2002, pp. 6595-6600.

(Continued)

*Primary Examiner* — Kevin Bernatz
(74) *Attorney, Agent, or Firm* — Hollingsworth Davis, LLC (57) ABSTRACT

An apparatus includes a plurality of bilayer structures positioned adjacent to each other, each of the bilayer structures including a first layer of magnetic material having a first Curie temperature and a second layer of magnetic material positioned adjacent to the first layer, wherein the second layer has a second Curie temperature that is lower than the first Curie temperature, and magnetic grains of the first layer are unstable when the second layer of magnetic material is heated above the second Curie temperature. The recording temperature is reduced due to the smaller switching volume achieved by using vertically decoupled laminations at elevated temperatures.

13 Claims, 8 Drawing Sheets

U.S. PATENT DOCUMENTS

| | | | |
|---|---|---|---|
| 6,017,619 A | 1/2000 | Shin et al. | |
| 6,200,673 B1 | 3/2001 | Miyamoto et al. | |
| 6,388,956 B1 | 5/2002 | Mori et al. | |
| 6,424,601 B1 | 7/2002 | Oonuki et al. | |
| 6,468,670 B1 | 10/2002 | Ikeda et al. | |
| 6,534,203 B2 | 3/2003 | Iwasaki et al. | |
| 6,534,204 B1 | 3/2003 | Akimoto et al. | |
| 6,534,205 B2 | 3/2003 | Sato et al. | |
| 6,545,955 B1 | 4/2003 | Iwata et al. | |
| 6,551,728 B1 | 4/2003 | Acharya et al. | |
| 6,602,621 B2 | 8/2003 | Matsunuma et al. | |
| 6,671,234 B1 | 12/2003 | Hirokane et al. | |
| 6,707,766 B2 | 3/2004 | Mori et al. | |
| 6,754,020 B1 | 6/2004 | Hikosaka et al. | |
| 6,777,112 B1 | 8/2004 | Girt et al. | |
| 6,815,098 B2 | 11/2004 | Matsunuma et al. | |
| 6,830,824 B2 | 12/2004 | Kikitsu et al. | |
| 6,834,026 B2 | 12/2004 | Fullerton et al. | |
| 6,881,497 B2* | 4/2005 | Coffey et al. | 428/828.1 |
| 6,916,556 B2 | 7/2005 | Lee | |
| 6,950,260 B2 | 9/2005 | Coffey et al. | |
| 7,060,375 B2* | 6/2006 | Lee et al. | 428/829 |
| 7,678,476 B2* | 3/2010 | Weller et al. | 428/828.1 |
| 2001/0051287 A1* | 12/2001 | Kikitsu et al. | 428/694 ML |
| 2002/0191320 A1 | 12/2002 | Coffey et al. | |
| 2003/0108721 A1 | 6/2003 | Fullerton et al. | |
| 2003/0143433 A1* | 7/2003 | Yoshida et al. | 428/694 TM |
| 2004/0166371 A1 | 8/2004 | Berger et al. | |
| 2004/0185306 A1* | 9/2004 | Coffey et al. | 428/694 TM |
| 2005/0106422 A1 | 5/2005 | Lu et al. | |
| 2005/0135010 A1 | 6/2005 | Liu et al. | |
| 2005/0142387 A1 | 6/2005 | Araki et al. | |
| 2007/0172705 A1* | 7/2007 | Weller et al. | 428/827 |
| 2010/0149676 A1* | 6/2010 | Khizorev et al. | 360/55 |

FOREIGN PATENT DOCUMENTS

| | | |
|---|---|---|
| DE | 19621383 A1 | 12/1996 |
| EP | 0428271 A2 | 5/1991 |
| JP | 7334878 A | 12/1995 |
| JP | 10091938 A | 4/1998 |
| JP | 2005310368 A | 11/2005 |
| JP | 2006209903 A | 8/2006 |

OTHER PUBLICATIONS

J.-U. Thiele et al., "Magnetic and Structural Properties of FePt-FeRh Exchange Spring Films for Thermally Assisted Magnetic Recording Media", IEEE Transactions on Magnetics, vol. 40, No. 4, Jul. 2004, pp. 2537-2542.

J.-P. Wang et al., "Exchange Coupled Composite Media for Perpendicular Magnetic Recording", IEEE Transactions on Magnetics, vol. 41, No. 10, Oct. 2005, pp. 3181-3186.

* cited by examiner

LAMINATED EXCHANGE COUPLING ADHESION (LECA) MEDIA FOR HEAT ASSISTED MAGNETIC RECORDING

CROSS-REFERENCE TO RELATED APPLICATION

This application is a continuation-in-part application of U.S. patent application Ser. No. 11/336,799, titled "Composite Heat Assisted Magnetic Recording Media With Temperature Tuned Intergranular Exchange", filed Jan. 20, 2006, now U.S. Pat. No. 7,678,476.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to data storage media, and more particularly to such media for use in heat assisted magnetic storage systems.

BACKGROUND OF THE INVENTION

Heat assisted magnetic recording (HAMR) utilizes thermal energy to lower the energy barrier for magnetization reversal of magnetic grains in a magnetic storage media. To realize thermally assisted reversal of the direction of magnetization of the grains, the writing temperature should be very close to the Curie temperature ($T_c$) of the materials used in the storage media. Moreover, $T_c$ should be lower than the boiling temperature (e.g., 650 K) of a lubricant that coats the top of the media.

There is a strong relationship between $T_c$ and magnetic anisotropy ($K_u$) of magnetic materials. Generally speaking, high $K_u$ materials have higher $T_c$'s. For example, in a single crystalline film of magnetic material such as FeNiPt, when $T_c$ is reduced, the $K_u$ is also reduced significantly. Such physical realities make it difficult to use HAMR efficiently to increase areal density of magnetic recording.

Data bits stored on a storage media are represented by the direction of magnetization of a plurality of grains of magnetic material in the storage media. The direction of magnetization of the grains is set by a magnetic field produced by a recording head in a writing operation. Even when the media is heated to the Curie temperature during writing, the Zeeman energy provided by the interaction of a magnetic field from a recording head and media grain magnetization is very small because the magnetization of the media grains is close to zero. As a result, media grains do not experience a strong difference between the desired writing direction of the magnetization and the opposite direction. Thus, when the recorded bit is cooled, many grains may be frozen into unwanted magnetization directions.

One way to address this issue is to use a data storage media having a FePt/FeRh bilayer structure. When heated, the FeRh layer's magnetization can be instantaneously changed from zero (i.e., the antiferromagnetic state) to above 1000 emu/$cm^3$. If FePt grains are positioned on top of the FeRh grains, the magnetically soft FeRh will reduce the switching field of the FePt grains. However, since both FeRh and FePt are chemically ordered structures, which require thermal processing during manufacture, it is difficult to make either of the thin films into a layer of fine grains. Furthermore, in a previous two layer design, the top layer was used to improve the thermal stability, and the discontinuous bottom layer had a relatively large unit size, which limited the thermal assisted switching effect.

There is a need for storage media that uses high $K_u$ materials that can be switched in a HAMR data storage system.

SUMMARY OF THE INVENTION

In a first aspect, the invention provides an apparatus including a plurality of bilayer structures positioned adjacent to each other, each of the bilayer structures including a first layer of magnetic material having a first Curie temperature and a second layer of magnetic material positioned adjacent to the first layer, wherein the second layer has a second Curie temperature that is lower than the first Curie temperature, and magnetic grains of the first layer are unstable when the second layer of magnetic material is heated above the second Curie temperature.

The apparatus can further include an exchange coupling control layer positioned between the first and second layers. The exchange coupling control layer can have a thickness between about 0 nm and about 5 nm.

Magnetic grains in the first layer can have diameters of between about 1 nm and about 10 nm, and magnetic grains in the second layer can have diameters of between about 1 nm and about 1000 nm. The first layer can have a thickness between about 2 nm and about 30 nm, and the second layer can have a thickness between about 0.5 nm and about 30 nm.

The first layer of magnetic material in each of the bilayers can be a multilayer structure.

The first layer in each of the bilayers can include a first plurality of grains of magnetic material having a first intergranular exchange coupling, and the second layer in each of the bilayers can include a second plurality of grains of magnetic material having a second intergranular exchange coupling, wherein the second intergranular exchange coupling is larger than the first intergranular exchange coupling.

In another aspect, the invention provides an apparatus including first and second layers of magnetic materials positioned on opposite sides of a third layer of magnetic material, wherein the first and second layers have Curie temperatures higher than the Curie temperature of the third layer, and wherein magnetic grains of the first and second layers are unstable when the third layer of magnetic material is heated above its Curie temperatures.

The apparatus can further include an exchange coupling control layer positioned between the first layer and the third layer. The exchange coupling control layer can have a thickness between about 0 nm and about 5 nm.

In another aspect, the invention provides an apparatus including first and second layers of magnetic materials positioned on opposite sides of a third layer of magnetic material, wherein the first and second layers have Curie temperatures lower than the Curie temperature of the third layer, and wherein magnetic grains of the third layer are unstable when the first and second layers of magnetic material are heated above their Curie temperatures.

The apparatus can further include an exchange coupling control layer positioned between the first layer and the third layer. The exchange coupling control layer can have a thickness between about 0 nm and about 5 nm.

In another aspect, the invention provides an apparatus including a plurality of bilayer structures positioned adjacent to each other, each of the bilayer structures including a first layer of magnetic material having a first Curie temperature and a second layer of magnetic material positioned adjacent to the first layer, wherein the second layer has a second Curie temperature that is lower than the first Curie temperature, and the magnetic grains in the first layer have diameters of between about 1 nm and about 10 nm, and magnetic grains in the second layer have diameters of between about 1 nm and about 1000 nm.

In another aspect, the invention provides an apparatus including a plurality of bilayer structures positioned adjacent to each other, each of the bilayer structures including a first layer of magnetic material having a first Curie temperature and a second layer of magnetic material positioned adjacent to the first layer, wherein the second layer has a second Curie temperature that is lower than the first Curie temperature, and the first and second layers of magnetic material are magnetically coupled to each other at room temperature and magnetically uncoupled when one of the layers of magnetic material is heated above its Curie temperature.

DETAILED DESCRIPTION OF THE INVENTION

Figure 1:
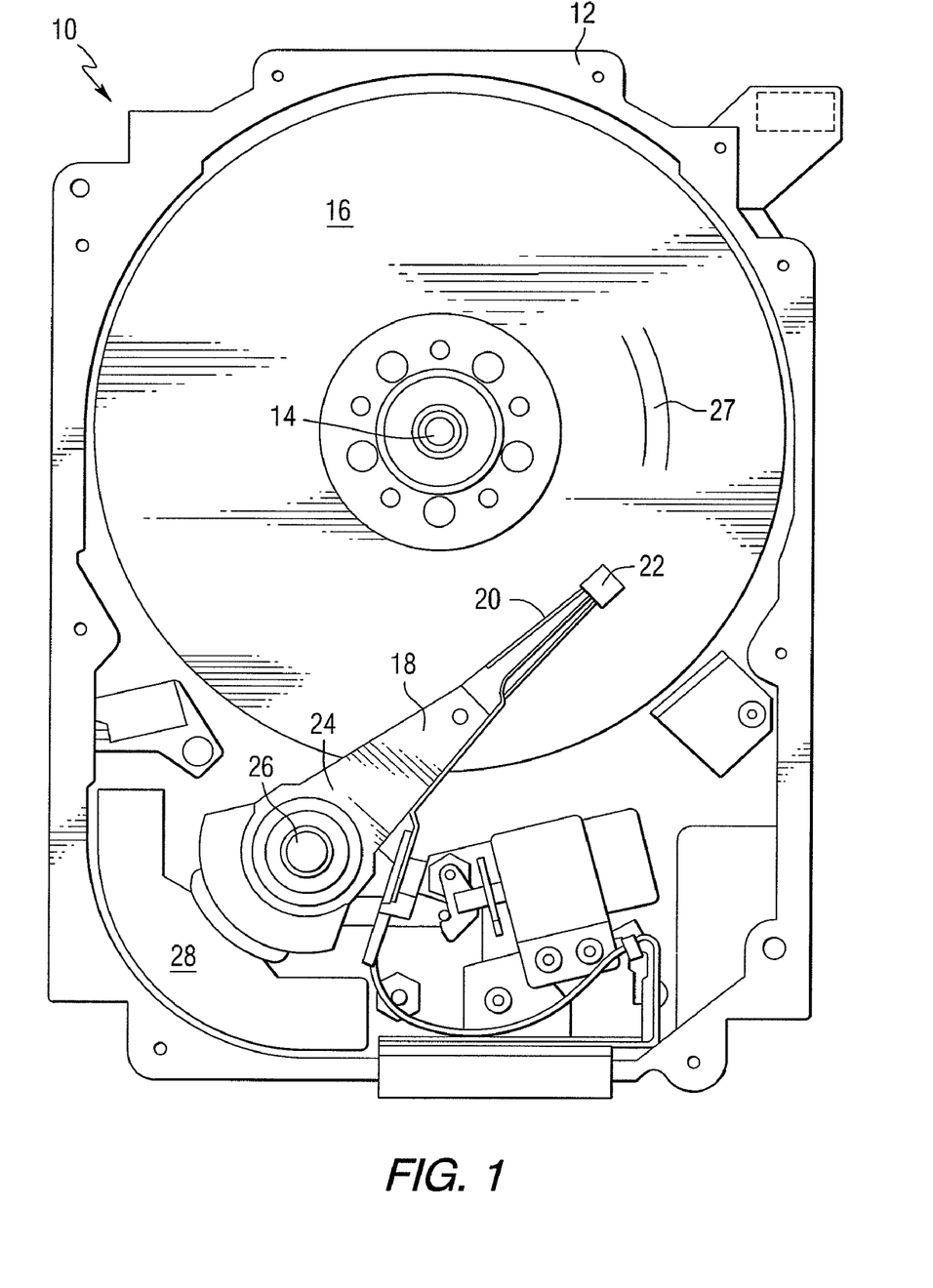
FIG. 1 is a pictorial representation of a data storage device in the form of a disc drive storage system that can include data storage media having a magnetic recording film in accordance with an aspect of the invention.

FIG. 1 is a pictorial representation of a data storage device in the form of a disc drive 10 that can utilize a storage media constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the aim's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light to the storage media for localized heating of the storage media. To launch light into the waveguide, a grating coupler can be used.

While FIG. 1 shows a disc drive, the invention can be applied to other storage devices that include a transducer and a storage media, wherein the storage media is heated to facilitate switching of bits in the storage media. Other such storage devices can include, for example, probe type data storage devices.

Figure 2:
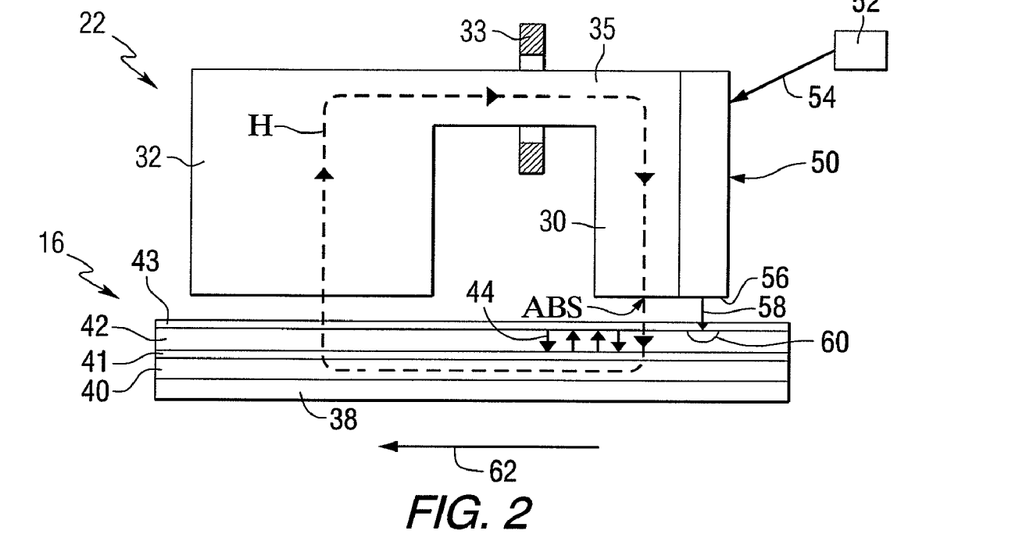
FIG. 2 is a schematic illustration of a heat assisted magnetic recording head and an adjacent data storage media.

FIG. 2 is a schematic side view of a HAMR recording head 22 and a magnetic storage media 16. Although this example shows a perpendicular magnetic recording head and a perpendicular magnetic storage media, it will be appreciated that the invention may also be used in conjunction with other types of recording heads and/or storage media where it may be desirable to employ heat assisted recording.

In the example of FIG. 2, the head 22 includes a writer section comprising a main write pole 30 and a return or opposing pole 32 that are magnetically coupled by a yoke or pedestal 35. It will be appreciated that the head 22 may be constructed with a write pole 30 only and no return pole 32 or yoke 35. A magnetization coil 33 surrounds the yoke or pedestal 35 for energizing the head 22. The HAMR head 22 may also include a read portion, not shown, which may be any conventional type read head as is generally known in the art. The storage media 16 is positioned adjacent to or under the recording head 22. Relative movement between the head and the media is indicated by arrow 62.

As illustrated in FIG. 2, the recording head 22 also includes a structure for heating the magnetic storage media 16 proximate to where the write pole 30 applies the magnetic write field H to the storage media 16. The media 16 includes a substrate 38, a heat sink layer 40, a seed layer 41, a magnetic recording layer 42, and a protective layer 43. A magnetic field H produced by current in the coil 33 is used to control the direction of magnetization of bits 44 in the recording layer of the media.

The structure for heating the media may include, for example, a planar optical waveguide schematically represented by reference number 50. The waveguide 50 conducts energy from a source 52 of electromagnetic radiation, which may be, for example, ultraviolet, infrared, or visible light. The source 52 may be, for example, a laser diode, or other suitable laser light source for directing a light beam 54 toward the waveguide 50. Various techniques that are known for coupling the light beam 54 into the waveguide 50 may be used. For example, the light source 52 may work in combination with an optical fiber and external optics for collimating the light beam 54 from the optical fiber toward a diffraction grating on the waveguide. Alternatively, a laser may be mounted on the waveguide 50 and the light beam 54 may be directly coupled into the waveguide 50 without the need for external optical configurations. Once the light beam 54 is coupled into the waveguide 50, the light propagates through the waveguide 50 toward a truncated end 56 of the waveguide 50 that is formed adjacent the air-bearing surface (ABS) of the recording head 22. Light 58 exits the end of the waveguide and heats a portion 60 of the media, as the media moves relative to the recording head as shown by arrow 62.

Figure 3:
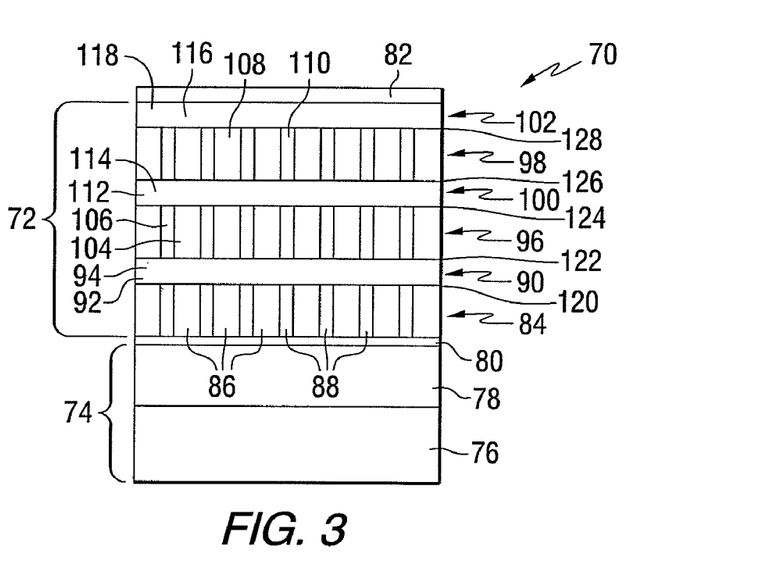
FIG. 3 is a schematic sectional view of storage media including a magnetic recording film in accordance with an aspect of the invention.

FIG. 3 is a schematic representation of a storage media 70 constructed in accordance with one aspect of the invention. This media is referred to as Laminated Exchange Coupling Adhesion (LECA) media. The word "adhesion" indicates that the layers are magnetically coupled together at room temperature, but at write temperature, the intergranular and interlayer coupling is eliminated when one of the layers is heated above its Curie temperature. The storage media 70 includes a composite thin film magnetic recording layer 72 on an underlayer structure 74. In this example the underlayer structure includes a substrate 76, a heat sink layer 78 that may serve as a soft magnetic underlayer, and a seed layer 80 on the heat sink layer.

The substrate 76 may be made of any suitable material such as ceramic glass, amorphous glass, aluminum or NiP coated AlMg. The heat sink layer 78 can have a thickness of from about 10 nm to about 1000 nm, and may be made of any suitable material such as Cu, Ag, Al, Au, CuZr, CoFe, FeCoB, FeAlN, FeAlSi, NiFe, CoZrNb or FeTaN. The heat sink layer 78 may also comprise a plurality of laminated layers. A protective and/or lubricating layer 82 can be provided on the recording layer.

The composite thin film magnetic recording layer includes a first (or bottom) layer 84, which in this example is a granular layer having magnetic grains 86, that are separated by a decoupling material 88, which can be an oxide. The composite magnetic recording film further includes a second layer (or top) 90 that is a substantially continuous layer. The second layer can have magnetic grains 92 that are larger than the grains of the first layer. The grains 92 of layer 90 can also be separated by an oxide 94. In one example, layer 84 can have a thickness in the range of about 2 nm to about 30 nm, and layer 90 can have a thickness in the range of about 0.5 nm to about 30 nm. Layers 84 and 90 form a first bilayer structure. Layer 90 can be a continuous layer or a discontinuous layer. As used herein, a continuous layer includes magnetic grains that are more exchange coupled, with less or no oxide doping used as grain segregation, and discontinuous layer includes magnetic grains that are less exchange coupled, with more oxide doping used as grain segregation.

The composite thin film magnetic recording layer includes additional layers 96 and 98 that can be similar to layer 84, and layers 100 and 102 that can be similar to layer 90. In this example layer 96 is a granular layer having magnetic grains 104, that are separated by a decoupling material 106, which can be an oxide, and layer 98 is a granular layer having magnetic grains 108, that are separated by a decoupling material 110, which can be an oxide. Layer 100 can be a granular layer having magnetic grains 112, that are separated by a decoupling material 114, which can be an oxide, and layer 102 can be a granular layer having magnetic grains 116, that are separated by a decoupling material 118, which can be an oxide. Layers 96 and 100 form a second bilayer structure, and layers 98 and 102 form a third bilayer structure.

Layers 84, 94 and 96 are high $K_u$, high $T_c$ layers having a granular structure that is thermally unstable in the absence of magnetic coupling through layers 90, 100 and 102. Layers 90, 100 and 102 are low $T_c$ layers, having grains that are continuously exchange coupled with each other at temperatures below the recording temperature. Layers 90, 100 and 102 are referred to as exchange coupling layers.

Optional exchange coupling control layers 120, 122, 124, 126 and 128 may be provided between the layers to allow tuning of the interlayer exchange coupling. The thickness of the optional exchange coupling control layers can be changed to control the amount of exchange coupling between the first and second layers. The exchange coupling control layers can have a thickness of about 0 nm to about 5 nm, and can be made of, for example, Pt, Ir, Rh, Pd or Ru.

The seed layer can have a thickness of from about 1 nm to about 50 nm and may be used to control properties such as orientation and grain size of the subsequently deposited layers. For example, the seed layer may be a face centered cubic material such as Pt which controls the orientation of layer 84, or a material such as Ru or Rh which controls grain size and facilitates epitaxial growth of the subsequently deposited layers, or a combination thereof. The seed layer may be made of one or more layers of material such as CoCr, CoCrRu, Ru, Pt, Pd, Rh, Ta, TiC, indium tin oxide (ITO), AlN, ZnO or another metal oxide. The protective layer 82 may be made of any suitable material such as diamond-like carbon.

In one aspect, the invention provides a composite HAMR storage media with a thin film recording layer including layers of magnetic material having different Curie temperatures and different intergranular exchange coupling. The recording layer in the storage media includes at least two different functional (i.e., magnetic) components. The magnetic component of layers 84, 96 and 98 can be, for example, $Co_3Pt$, CoXPt alloy, CoX/Pt multilayer, CoXPd alloy, CoX/Pd multilayer, FePt, FeYPt alloy, or TbFeCo, wherein X can be, for example, Cr, B, Ni, Ta, etc., and Y can be, for example, Cu, Ni, Co, B, Ag, Au, Mn, etc. Since the Curie temperatures are material dependent, the layers can be constructed to have different Curie temperatures by using different compositions. Grain sizes can be between about 1 nm and about 10 nm in layers 84, 96 and 98, and between about 1 nm and about 1000 nm in layers 90, 100 and 102. These grain sizes are in-plane dimensions that approximate the diameter of the grains, although the grains are not truly circular.

In the example of FIG. 3, the high $K_u$, high $T_c$, layers 84, 96 and 98 have high anisotropy and smaller grains, and are thermally unstable by themselves at storage temperatures (or room temperature (RT)), while low $T_c$ layers 90, 100 and 102 have grains with comparable (or smaller) anisotropy but much larger intergranular exchange coupling. Intergranular exchange coupling is the magnetic energy resulting from the magnetic interaction of the granular magnetic material. In each layer the grains are positioned in a plane and extend through the plane thickness. Since the magnetic coupling is a very short range interaction, the interaction energy is determined by properties of the layer's microstructure and specifically the grain boundaries.

At the recording temperature, the low $T_c$ layers (in this example, layers 90, 100 and 102) are heated to a temperature above the Curie temperature and become non-magnetic. Hence coupling between grains of the high $T_c$ layers through the low $T_c$ layers is smaller at recording temperatures than at storage temperatures. However, at storage temperatures the thermal stability of the multilayer media is enhanced due to increased intergranular exchange coupling between grains of the high $T_c$ layers, through the low $T_c$ layers.

The high $T_c$, high $K_u$ grains can be small (e.g., 5 nm) with a well-decoupled granular microstructure. The substantially continuous layers (in this example, layers 90, 100 and 102) are the low $T_c$ magnetic layers that can be epitaxially grown on top of the high $T_c$ layers; they also allow the next high $T_c$ layer to be grown epitaxially.

Generally speaking, high $K_u$ materials have higher $T_c$'s. The strong relationship between $T_c$ and magnetic anisotropy ($K_u$) of magnetic materials is also observed in Co/Pt multilayer systems. The high $T_c$ layers can therefore be constructed of multilayers such as Co/Pt.

Figure 4:
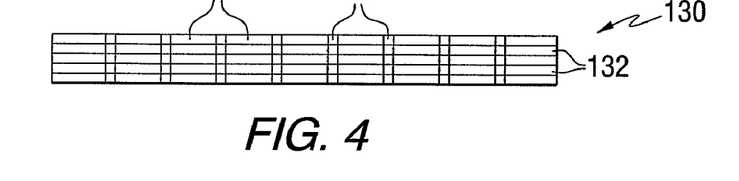
FIG. 4 is a side view of a layer in the storage media of FIG. 3.

FIG. 4 is a side view of a multilayer structure 130 that can be used for the layers of the media of FIG. 3. The multilayer structure 130 includes a plurality of layers 132, which can be, for example, Co/Pt layers. Magnetic grains 134 in the layers are separated by an oxide 136. In Co/Pt multilayer systems, the $T_c$ and $K_u$ of the Co/Pt multilayer structure 130 can be changed by varying relative thickness of Co and Pt layers.

The individual high $T_c$ and high $K_u$ grains are thermally unstable at the recording temperature and within the time scale of the writing. At lower temperatures these thermally unstable grains are coupled with each other laterally and vertically through the adjacent low $T_c$ layer. At recording temperatures (i.e., $T_{write}$>the low $T_c$) the high $T_c$ grains are superparamagnetic since the exchange adhesion layers (i.e., the low $T_c$ layers) become paramagnetic. Then when the applied writing field is larger than the dynamic saturation field of the storage media, the direction of magnetization of the magnetic grains subjected to the write field will align with the applied write field.

In one example, both the high $T_c$ and low $T_c$ layers can each be constructed using Co/Pt multilayers. Such Co/Pt multilayers are suitable for HAMR storage media, because the $K_u$ of the high $T_c$ multilayer is about $1\times10^7$ erg/cc at $T_c$=1000 K, and $3\times10^6$ erg/cc at $T_c$=650 K. If the high $K_u$ multilayer grain size is about 6 nm, with a thickness of about 2-3 nm, the grains would be thermally unstable at a HAMR writing temperature within an expected writing time scale.

A significant advantage of this media design is that the writing temperature is much lower than the high $T_c$. Consequently the magnetic saturation ($M_s$) of the high $T_c$ layer is still very high. The effect of magnetic switching (i.e., the Zeeman energy) is significantly higher than would be the case for writing at the Curie temperature, where $M_s$ is just above zero.

Figure 5:
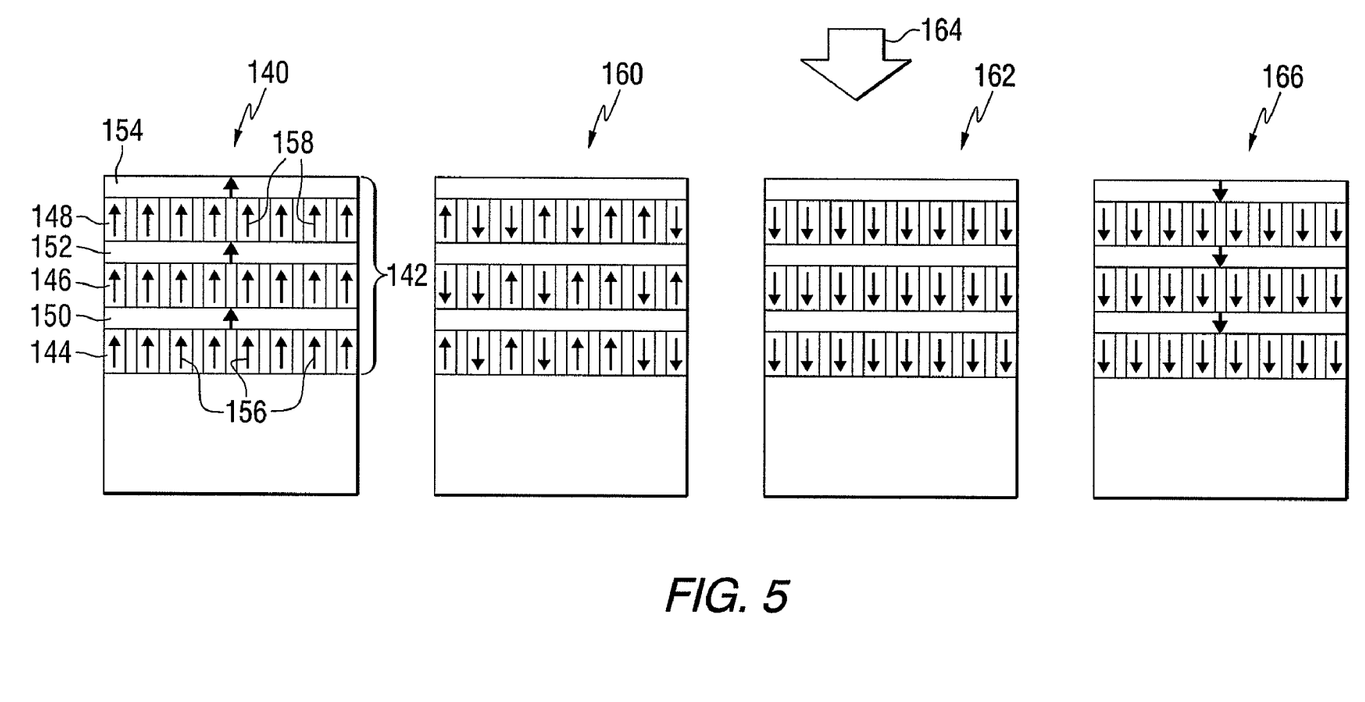
FIG. 5 is a schematic diagram that illustrates switching in a magnetic recording film in accordance with an aspect of the invention.

FIG. 5 is a schematic diagram that illustrates switching in a magnetic recording film in accordance with an aspect of the invention. Item 140 represents a bit in a magnetic recording film 142 having three high $T_c$ layers 144, 146 and 148, and three low $T_c$ layers 150, 152 and 154. The high $T_c$ layers include a plurality of magnetic grains 156. The temperature of the film is initially below the Curie temperature of the low $T_c$ layers, and all of the grains 156 have the same direction of magnetization as illustrated by the arrows 158, and the direction of magnetization of the low $T_c$ layers is also fixed, in this case in a vertical direction.

Item 160 represents a bit in the magnetic recording film 142, which has been heated above the Curie temperature of the low $T_c$ layers. At this temperature, the low $T_c$ layers are paramagnetic and the grains of the high $T_c$ layers are no longer magnetically coupled through the low $T_c$ layers. Thus the directions of magnetization in the grains 156 are not uniform.

It is desirable that the direction of magnetization of substantially every magnetic grain in a recorded bit switches to a desired direction without freezing the magnetization of some of the grains in the wrong direction. Item 162 represents a bit in the magnetic recording film 142 when it is subjected to an external magnetic field 164, which can be a write field from a magnetic recording head. The magnetization of all (or in a practical example, substantially all) of the grains 156 aligns with the applied magnetic field. Then the film is allowed to cool, and the magnetization of all (or substantially all) of the grains 156 remains fixed in the new direction, as illustrated in bit 166.

Figure 6:
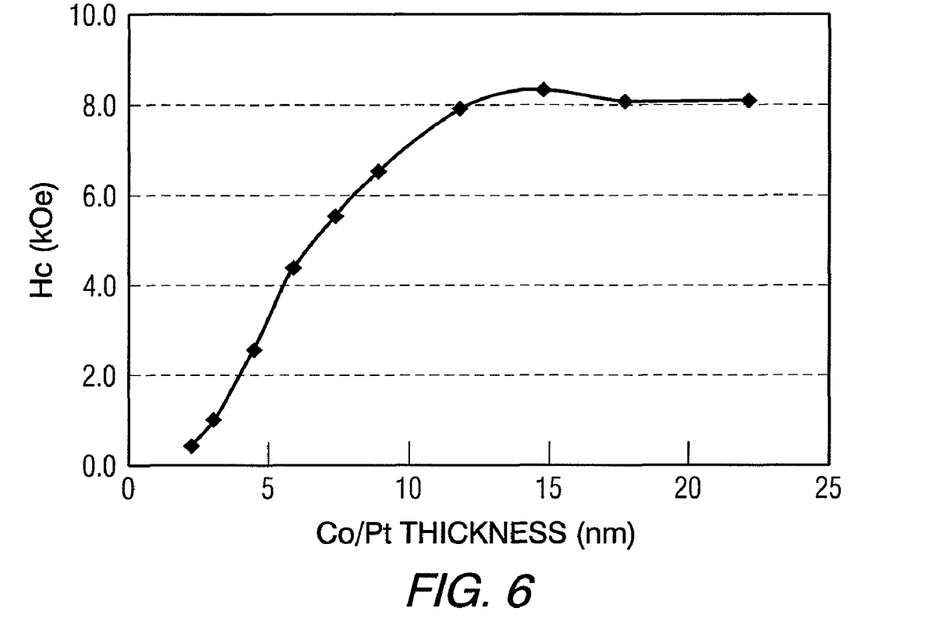
FIG. 6 is a graph of coercivity versus thickness.

FIG. 6 is a graph of coercivity $H_c$ versus thickness of high $T_c$, high $K_u$ Co/Pt multilayer films. Note that for layer thicknesses beyond 12 nm, the $H_c$ does not increase. This indicates the basic coherent switching unit is around 12 nm high for a column about 6 nm in diameter. The diameter of the grains can be estimated to be about 6 nm based on experience of past test results.

Using the structure of FIGS. 3 and 4 as a test structure wherein the layers are constructed as Co/Pt multilayers, when the thickness of the granular high $K_u$, high $T_c$ Co/Pt multilayer is reduced from about 24 nm to about 2 nm, the static MOKE $H_c$ of the films decreases dramatically as each individual grain becomes thermally unstable.

Figure 7:
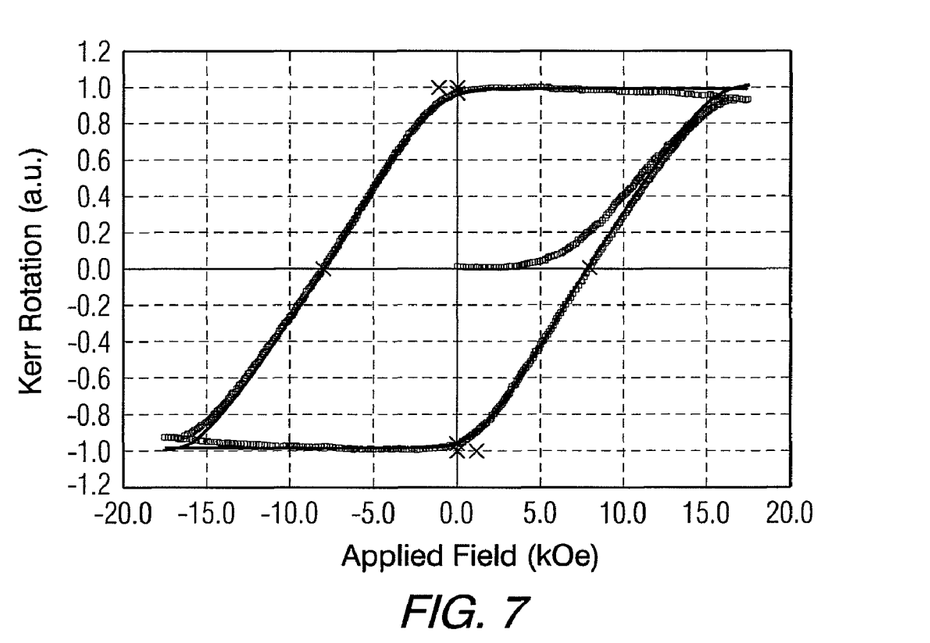
FIGS. 7-13 are hysteresis curves that illustrate the magnetic properties of various storage media.
Figure 8:
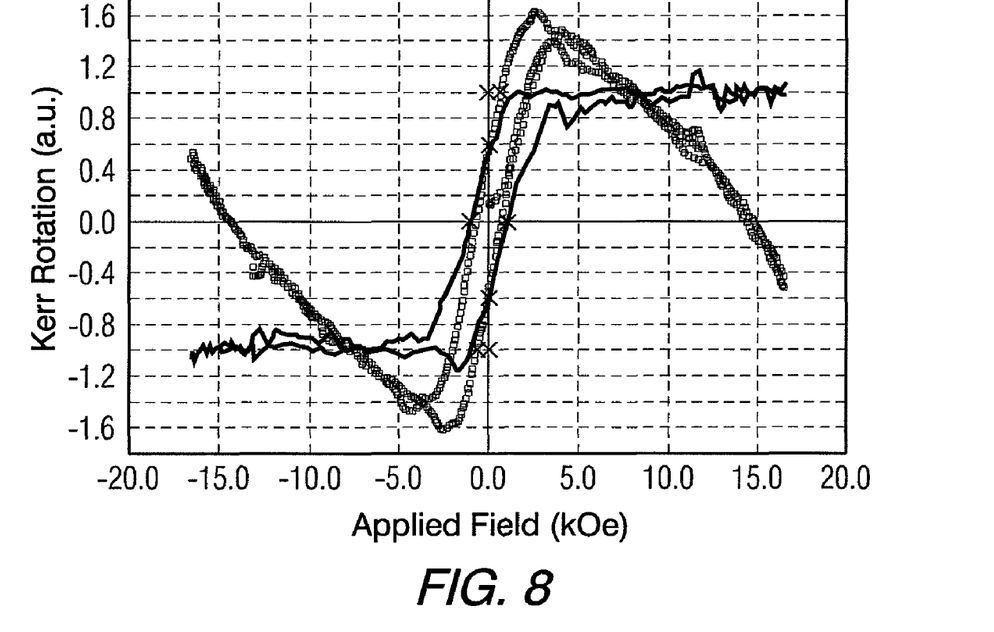

The hysteresis loops of the 11.8 nm and 2.9 nm samples are shown in FIGS. 7 and 8 respectively. In one embodiment, the full structure of the films is: Glass substrate\Ta 3 nm\RuCr 10 nm\Ru+ZrO$_2$ 15 nm\(Co/Pt)×16+Nb$_2$O$_5$ 20 vol %\carbon overcoat. The Ta and RuCr layers are seed layers. The Ru+ZrO$_2$ layer is a low $T_c$ layer interlayer that provides a template for smaller grains. A multilayer with 16 repeats (i.e., 16 bilayers adjacent to each other) can be used in a media with an 11.8 nm thickness, as shown in FIG. 7, and a multilayer with 4 repeats can be used in a media with a 2.9 nm thickness, as shown in FIG. 8.

FIGS. 9-12 are hysteresis curves that illustrate the magnetic properties of various storage media. In FIGS. 7-13, the curve with open symbols is the MOKE loop without background correction, and the solid line curve is the true MOKE loop after linear background correction.

FIG. 7 shows the MOKE hysteresis loops of a single granular high $K_u$ Co/Pt layer having a thickness of 11.8 nm. FIG. 8 shows the MOKE hysteresis loops of a single granular high $K_u$ Co/Pt structure having a thickness of 2.9 nm. It can be seen that the grains in the 11.8 nm thick films are well decoupled. The value of $H_c$–$H_n$ is 6.8 kOe, where $H_n$ is the nucleation field. This is equal to a $4\pi M_s$ value of 7.2 kOe for the sample assuming that $M_s$ is 600 emu/cc. Therefore there is very little exchange coupling between the grains. It also can be seen that the thinner sample becomes superparamagnetic at room temperature within the time scale of MOKE measurement. The loop cannot keep the full remanence. Neither does it have a high coercivity.

Figure 9:
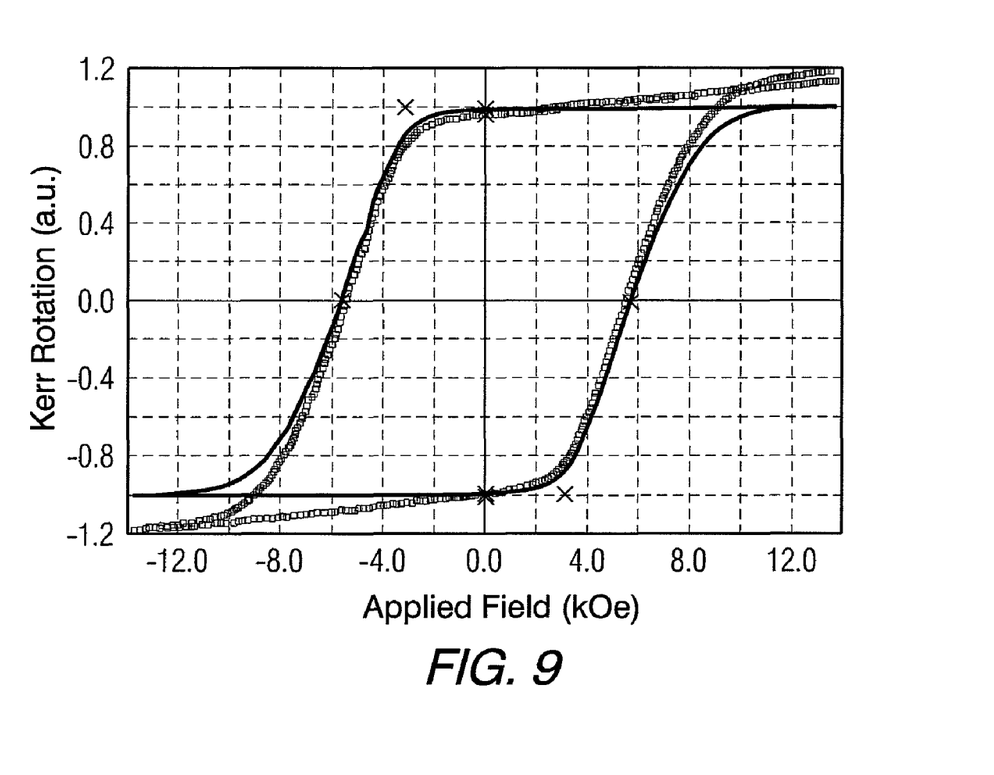
Figure 10:
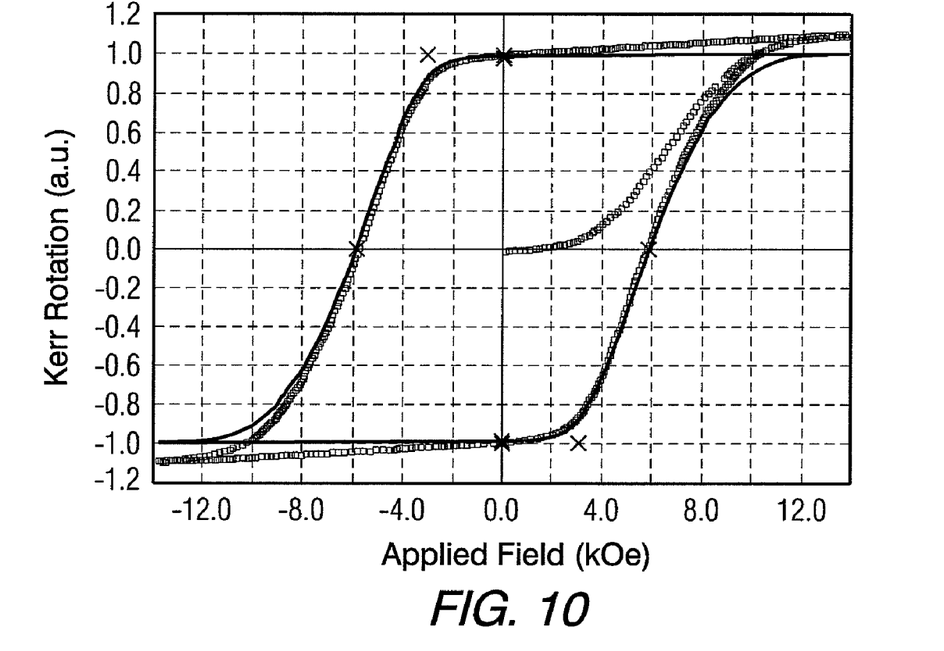
Figure 11:
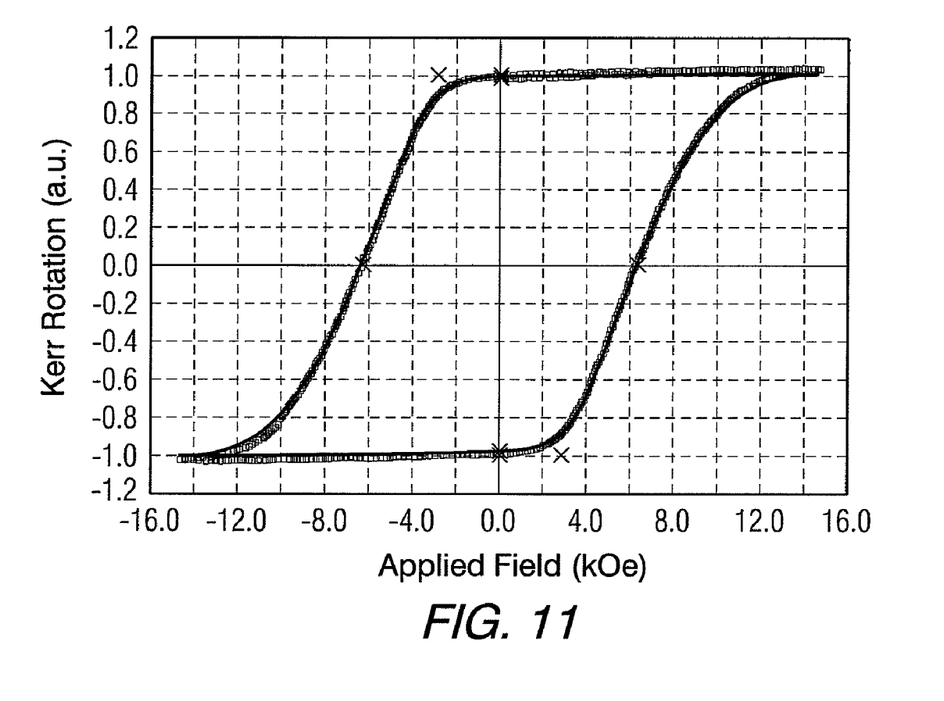
Figure 12:
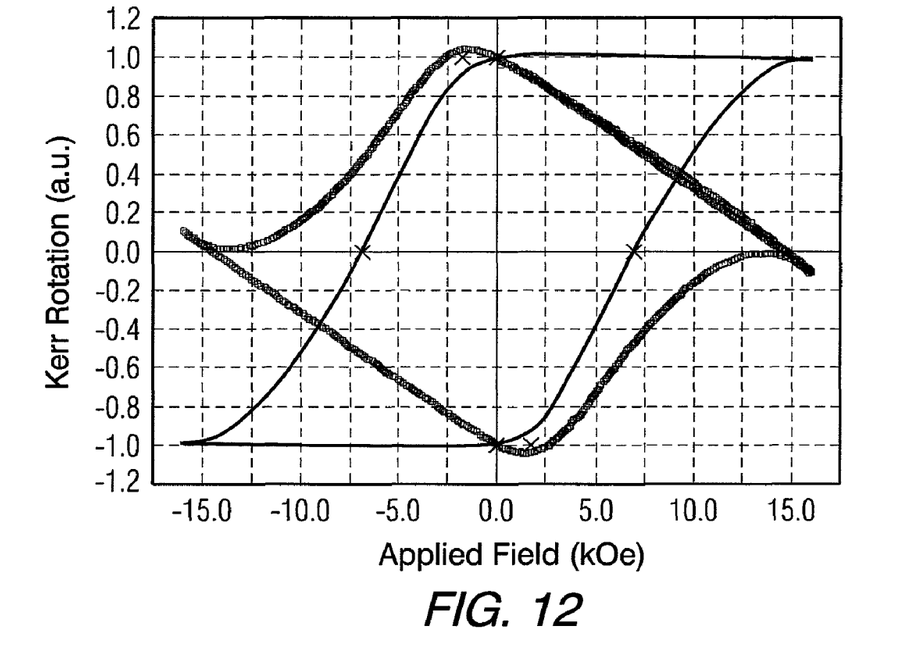

Hysteresis curves for four different configurations of LECA media having the structure of FIG. 3 are shown in FIGS. 9-12. The high $K_u$ multilayer is fixed at 2.9 nm where an individual layer of such multilayer would be superparamagnetic. FIG. 9 shows the MOKE hysteresis loop of LECA media with an exchange layer thickness of 3.1 nm. FIG. 10 shows the MOKE hysteresis loop of a LECA media with an exchange layer thickness of 2.3 nm. FIG. 11 shows the MOKE hysteresis loop of a LECA media with an exchange layer thickness of 1.6 nm. FIG. 12 shows the MOKE hysteresis loop of a LECA media with an exchange layer thickness of 0.8 nm.

Figure 13:
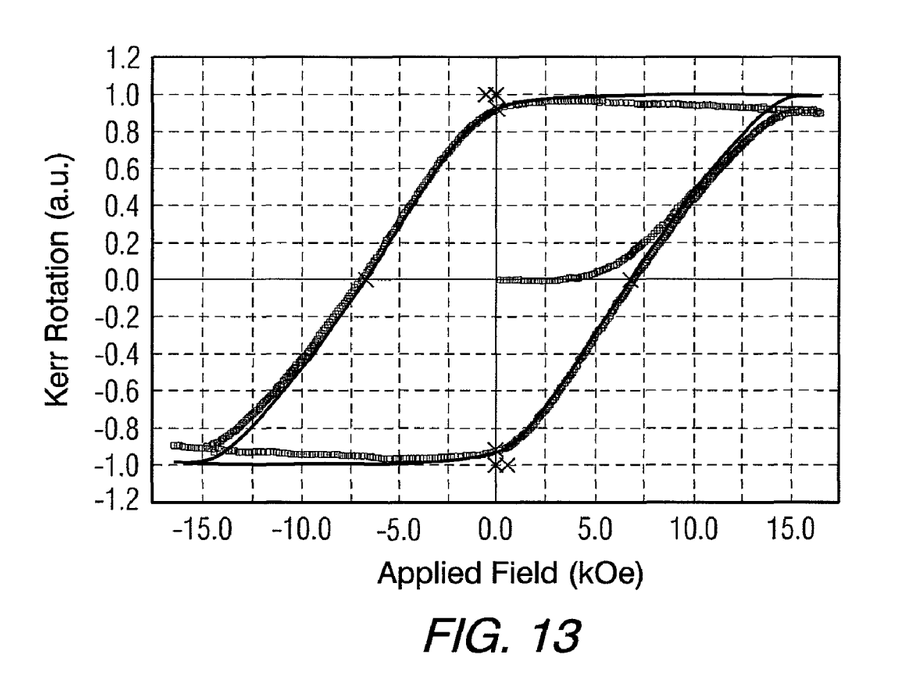

FIG. 13 shows the MOKE hysteresis loop of a high $T_c$ multilayer that has the same thickness of high $T_c$ multilayer in the LECA media in FIGS. 9-12, but without an exchange coupling layer.

In the examples shown in FIGS. 9-13, the thickness of the exchange coupling adhesion layer is reduced from about 3 nm to about 0 nm to demonstrate the exchange coupling effect in the LECA media. As it can be seen in FIGS. 7-13, the exchange layer gets thinner, the $H_n$ of the media becomes smaller, indicating the whole media becomes less thermally stable.

Granular, well-decoupled, high $T_c$ layers can be fabricated for use in data storage media. In one example of a multilayer structure, the grains can be epitaxially grown judging in the (111) orientation.

In one example, when the high $T_c$ layer is 3 nm thick, it is thermally unstable. However, when three layers of the 3 nm thick high $T_c$ are laminated with the low $T_c$ layers in the configuration shown in FIG. 3, they are very thermally stable.

Figure 14:
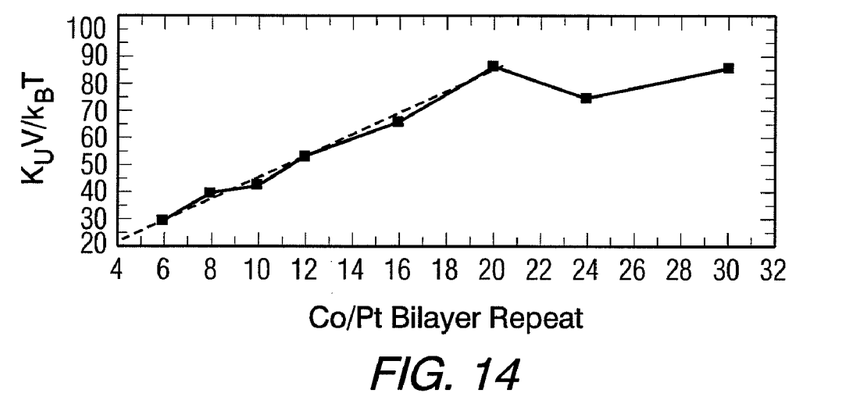
FIG. 14 is a graph of $K_u V/k_B T$ versus a number of bilayers in a storage media.

FIG. 14 shows thermal stability factor $K_u V/k_B T$ of the high $T_c$ layer versus a number of Co/Pt bilayers. With 4 bilayers corresponding to a 2.9 nm thickness, and 16 bilayers corresponding to a 11.8 nm thickness, at N=4, $K_u V/kT(300K)$~20, which would mean that the thermal stability factor will become less than 10 when it is heated above 600 K. This will allow switching of the grain at a small fraction (e.g., ¼ to ¹/₁₀) of the anisotropy field of the high $T_c$ layer, assuming a switching frequency $f_0$ of 30 GHz and write speed of 1 ns.

Figure 15:
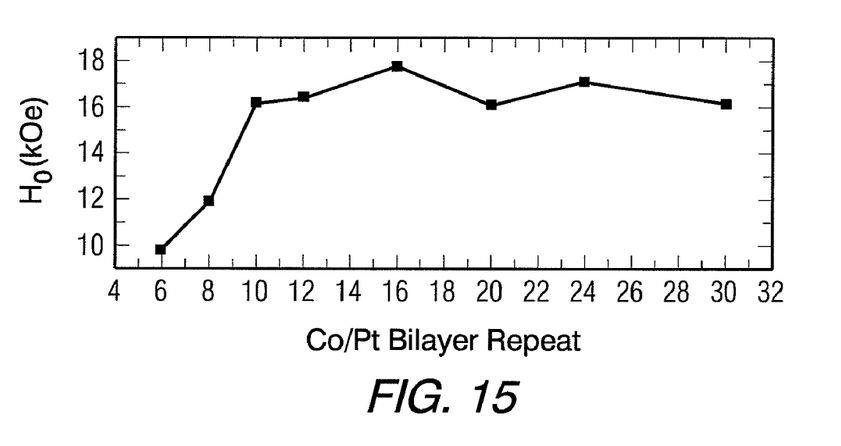
FIG. 15 is a graph of $H_o$ versus a number of bilayers in a storage media.

FIG. 15 shows that the dynamic coercivity $H_o$ starts to drop when the number (N) of repeated bilayers is less than 10 (i.e., N<10). This means the low $K_u/kT$ ratio takes effect in a short time scale even at room temperature.

MFM images on Laminated Exchange Coupling Adhesion (LECA) media show that the domain (e.g., magnetic cluster) size in the ac-erased state varies with the change of media composition (i.e., low $T_c$, high $T_c$ and oxide), which is due to the change of effective coupling.

Without an oxide in the multilayers, the film becomes very strongly exchange coupled. Qualitatively speaking, the high $T_c$ multilayer with the oxide has the smallest switching units, and the low $T_c$ with the oxide has larger switching units. That is, the switching cluster size of LECA is less than, or equal to that of the low $T_c$ oxide media. This is the case at room temperature, not necessarily the case at writing temperature since the coupled low $T_c$ media will be heated above $T_c$ and hence is non-magnetic, reducing the intergranular exchange coupling.

In one aspect, the invention provides a HAMR media, which fully utilizes the $K_u$ potential of a magnetic material system. It can be switched by HAMR at a lubricant friendly temperature, which is lower than the $T_c$ of the magnetic material.

Another advantage of the design is that the high $K_u$ grains possess a fairly high magnetic moment at the temperature of writing. As a result, a magnetic writer can exert a much stronger force to switch the grains when compared with $T_c$ writing where the moment is close to zero.

In one example, the invention provides a storage media having a plurality of bilayers, each including a first magnetic layer having a high $T_c$ and a high $K_u$, positioned adjacent to a second magnetic layer having a low $T_c$. Such a structure is sensitive to thermal magnetic writing below the $T_c$ of high $K_u$ grains in the first layer. Prior to heating the media, the direction of magnetization of the magnetic grains in the first layer is stable because the magnetic grains in the first layer are magnetically coupled to each other through the second layer. When the second layer is heated above its Curie temperature, the second layer changes to a paramagnetic state. This reduces the exchange coupling between grains in the high $K_u$ layer and those grains become superparamagnetic. Consequently, an applied magnetic field reverses the direction of magnetization of the superparamagnetic high $K_u$ grains.

In another aspect, the invention provides a data storage media including at least two layers of high $T_c$, high $K_u$ materials positioned on opposite sides of a layer of low $T_c$ materials. For example, in FIG. 4, high $T_c$, high $K_u$ layers 84 and 96 are positioned on opposite sides of a layer 90 of low $T_c$ materials.

In another aspect, the invention provides a data storage media including a layer of high $T_c$, high $K_u$ materials positioned between two layers of low $T_c$ materials. For example, in FIG. 4, high $T_c$, high $K_u$ layer 96 is positioned between layers 90 and 100 of low $T_c$ materials.

The media of this invention utilizes the temperature effects on the high $K_u$ materials to allow writing to the media below the Curie temperature of the high $K_u$ material. Another advantage of the design is that the high $K_u$ grains possess a fairly high magnetic moment at the temperature of writing. As a result, the magnetic writer can exert a much stronger force to switch the grains compared with writing at a temperature near the Curie temperature, where the moment is close to zero.

In one aspect, the apparatus of this invention uses thermally activated switching of small magnetic units, which are vertically exchange decoupled from other layers. The invention encompasses bilayer structures and other multilayer structures, including trilayer structures including a layer of low $T_c$ material between two layers of high $T_c$ material, or a layer of high $T_c$ material between two layers of low $T_c$ material. By using small magnetic units, the thermally assisted switching effect is enhanced. When used in a data storage medium, the recording temperature is reduced due to the smaller switching volume achieved by using vertically decoupled laminations at elevated temperatures.

While the invention has been described in terms of several examples, it will be apparent to those skilled in the art that various changes can be made to the described examples without departing from the scope of the invention as set forth in the claims.

What is claimed is:

1. An apparatus comprising:
   a bilayer structure including a first layer of magnetic material having a first Curie temperature and a first magnetic anisotropy, and a second layer of magnetic material positioned adjacent to the first layer, wherein the second layer has a second Curie temperature that is lower than the first Curie temperature and a second magnetic anisotropy that is lower than the first magnetic anisotropy, and magnetic grains of the first layer become superparamagnetic when the bilayer structure is heated to a temperature above the second Curie temperature and below the first Curie temperature.

2. The apparatus of claim 1, further comprising:
   an exchange coupling control layer positioned between the first and second layers.

3. The apparatus of claim 2, wherein the exchange coupling control layer has a thickness in a range from about 0 nm to about 5 nm.

4. The apparatus of claim 1, wherein:
   the magnetic grains in the first layer have diameters of in a range from about 1 nm to about 10 nm, and magnetic grains in the second layer have diameters of in a range from about 1 nm to about 1000 nm.

5. The apparatus of claim 1, wherein:
   the first layer has a thickness in a range from about 2 nm to about 30 nm, and the second layer has a thickness in a range from about 0.5 nm to about 30 nm.

6. The apparatus of claim 1, wherein:
   the first layer of magnetic material comprises a multilayer structure.

7. The apparatus of claim 1, wherein:
   the first layer includes a first plurality of grains of magnetic material having a first intergranular exchange coupling; and
   the second layer includes a second plurality of grains of magnetic material having a second intergranular exchange coupling, wherein the second intergranular exchange coupling is larger than the first intergranular exchange coupling.

8. The apparatus of claim 1, wherein the magnetic grains of the first layer are smaller than magnetic grains of the second layer and the first and second layers are exchange coupled with each other.

9. The apparatus of claim 1, wherein the first layer includes decoupling material between magnetic grains.

10. The apparatus of claim 9, wherein the decoupling material comprises an oxide.

11. The apparatus of claim 1, further comprising:

a substrate; and a seed layer deposited on the substrate, wherein the first layer is positioned directly adjacent the seed layer.

12. The apparatus of claim 1, wherein:

the first layer includes one or more of $CO_3Pt$, a CoXPt alloy, a CoX/Pt multilayer, a CoXPd alloy, a CoX/Pd multilayer, FePt, an FeYPt alloy, or TbFeCo, wherein X includes one or more of Cr, B, Ni and Ta, and wherein Y includes one or more of Cu, Ni, Co, B, Ag, Au and Mn.

13. An apparatus comprising:

a bilayer structure including a first layer of magnetic material having a first Curie temperature and a second layer of magnetic material positioned adjacent to the first layer, wherein the second layer has a second Curie temperature that is lower than the first Curie temperature, and the magnetic grains in the first layer have diameters of in a range from about 1 nm to about 10 nm, and magnetic grains in the second layer have diameters of in a range from about 1 nm to about 1000 nm.

\* \* \* \* \*